(12) United States Patent
Jedwab et al.

(10) Patent No.: US 7,149,949 B2
(45) Date of Patent: *Dec. 12, 2006

(54) METHOD FOR ERROR CORRECTION DECODING IN A MAGNETORESISTIVE SOLID-STATE STORAGE DEVICE

(75) Inventors: Jonathan Jedwab, London (GB); James Andrew Davis, Richmond, VA (US); Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 564 days.

This patent is subject to a terminal disclaimer.

(21) Appl. No.: 10/093,841

(22) Filed: Mar. 8, 2002

(65) Prior Publication Data

US 2003/0023927 A1 Jan. 30, 2003

Related U.S. Application Data

(63) Continuation-in-part of application No. 09/915,194, filed on Jul. 25, 2001, now Pat. No. 7,036,068.

(51) Int. Cl.
*G11C 29/42* (2006.01)
*G11C 29/40* (2006.01)

(52) U.S. Cl. ........................ 714/763; 714/718
(58) Field of Classification Search ................ 714/763, 714/773, 710, 718, 752, 746; 365/158, 200, 365/201; 375/133
See application file for complete search history.

(56) References Cited

U.S. PATENT DOCUMENTS

| 4,069,970 | A | 1/1978 | Buzzard et al. ............ 235/312 |
| 4,209,846 | A | 6/1980 | Seppa ...................... 364/900 |
| 4,216,541 | A | 8/1980 | Clover et al. |
| 4,458,349 | A | 7/1984 | Aichelmann, Jr. et al. |
| 4,845,714 | A | 7/1989 | Zook ....................... 714/755 |
| 4,933,940 | A | 6/1990 | Walter et al. |
| 4,939,694 | A | 7/1990 | Eaton et al. .............. 365/200 |
| 5,233,614 | A | 8/1993 | Singh ...................... 371/21.6 |
| 5,263,030 | A | 11/1993 | Roker et al. ............. 371/21.6 |
| 5,313,464 | A | 5/1994 | Reif ........................ 371/2.1 |
| 5,321,703 | A * | 6/1994 | Weng ....................... 714/797 |
| 5,428,630 | A | 6/1995 | Weng et al. ............. 371/40.1 |
| 5,459,742 | A | 10/1995 | Cassidy et al. |
| 5,488,691 | A | 1/1996 | Fuoco et al. ........... 395/185.05 |

(Continued)

FOREIGN PATENT DOCUMENTS

EP 0 494 547 A2 7/1992

(Continued)

OTHER PUBLICATIONS

Katayama et al., One-Shot Reed-Solomon Decoding for High-Performance Dependable Systems, Jun. 25-28, 2000, Proceedings International Conference on Dependable Systems and Networks 2000, DSN 2000, pp. 390-399.*

(Continued)

*Primary Examiner*—Albert Decady
*Assistant Examiner*—Dipakkumar Gandhi
(74) *Attorney, Agent, or Firm*—Ladas & Parry LLP

(57) ABSTRACT

A magnetoresistive solid-state storage device (MRAM) employs error correction coding (ECC) to form ECC encoded stored data. In a read operation, a set of test cells in a test row are used to predict failures amongst a set of cells of interest storing a block of ECC encoded data. Erasure information is formed from these predictions which identifies potentially unreliable symbols in the block of ECC encoded data, and the ability of a decoder to perform ECC decoding is substantially enhanced.

18 Claims, 5 Drawing Sheets

U.S. PATENT DOCUMENTS

| | | | |
|---|---|---|---|
| 5,502,728 A | 3/1996 | Smith, III | 395/182.03 |
| 5,504,760 A | 4/1996 | Harari et al. | |
| 5,590,306 A | 12/1996 | Watanabe et al. | 395/442 |
| 5,621,690 A * | 4/1997 | Jungroth et al. | 365/200 |
| 5,745,673 A | 4/1998 | Di Zenzo et al. | 395/182.05 |
| 5,793,795 A * | 8/1998 | Li | 375/133 |
| 5,848,076 A | 12/1998 | Yoshimura | |
| 5,852,574 A | 12/1998 | Naji | 365/158 |
| 5,864,569 A * | 1/1999 | Roohparvar | 714/773 |
| 5,887,270 A | 3/1999 | Brant et al. | 711/162 |
| 5,953,351 A | 9/1999 | Hicks et al. | 371/40.11 |
| 5,966,389 A | 10/1999 | Kiehl | 371/40.18 |
| 5,987,573 A | 11/1999 | Hiraka | 711/156 |
| 6,009,550 A | 12/1999 | Gosula et al. | 714/769 |
| 6,112,324 A * | 8/2000 | Howe et al. | 714/763 |
| 6,166,944 A | 12/2000 | Ogino | 365/97 |
| 6,233,182 B1 * | 5/2001 | Satou et al. | 365/200 |
| 6,275,965 B1 | 8/2001 | Cox et al. | 714/755 |
| 6,279,133 B1 | 8/2001 | Vafai et al. | 714/763 |
| 6,381,726 B1 | 4/2002 | Weng | 714/780 |
| 6,407,953 B1 * | 6/2002 | Cleeves | 365/201 |
| 6,408,401 B1 | 6/2002 | Bhavsar et al. | 714/7 |
| 6,430,702 B1 | 8/2002 | Santeler et al. | 714/6 |
| 6,456,525 B1 | 9/2002 | Perner et al. | 365/171 |
| 6,483,740 B1 * | 11/2002 | Spitzer et al. | 365/158 |
| 6,574,775 B1 | 6/2003 | Chouly | 714/800 |
| 6,684,353 B1 | 1/2004 | Parker et al. | 714/718 |
| 6,856,572 B1 | 2/2005 | Scheuerlein et al. | 365/230.06 |
| 6,990,622 B1 * | 1/2006 | Davis et al. | 714/763 |
| 2002/0029341 A1 | 3/2002 | Juels et al. | 713/184 |
| 2003/0023911 A1 | 1/2003 | Davis et al. | 714/723 |
| 2003/0023922 A1 | 1/2003 | Davis et al. | 714/763 |
| 2003/0023923 A1 | 1/2003 | Davis et al. | 714/763 |
| 2003/0023924 A1 | 1/2003 | Davis et al. | 714/763 |
| 2003/0023925 A1 | 1/2003 | Davis et al. | 714/763 |
| 2003/0023926 A1 | 1/2003 | Davis et al. | 714/763 |
| 2003/0023928 A1 | 1/2003 | Jedwab et al. | 714/763 |
| 2003/0156469 A1 | 8/2003 | Viehmann et al. | 365/200 |
| 2003/0172329 A1 | 9/2003 | Davis et al. | 714/710 |
| 2003/0172339 A1 | 9/2003 | Davis et al. | 714/763 |

FOREIGN PATENT DOCUMENTS

| | | |
|---|---|---|
| EP | 0 918 334 A2 | 5/1999 |
| EP | 1 132 924 A2 | 10/2000 |
| JP | 03-244218 | 10/1991 |
| JP | 10/261043 | 9/1998 |

OTHER PUBLICATIONS

Abstract of Japanese Patent No. JP 60007698, published Jan. 16, 1985, esp@cenet.com.

Peterson, W.W. and E.J. Weldon, Jr., *Error-Correcting Codes*, Second Edition, MIT Press, Ch. 1-3, 8 and 9 (1994).

*Reed-Solomon Codes and Their Applications*, S.B. Wicker and V.K. Bhargava, ed., IEEE Press, New York, Ch. 1, 2, 4 and 12 (1994).

* cited by examiner

METHOD FOR ERROR CORRECTION DECODING IN A MAGNETORESISTIVE SOLID-STATE STORAGE DEVICE

This is a continuation-in-part (CIP) of application Ser. No. 09/915,194, filed Jul. 25, 2001, now U.S. Pat. No. 7,036,068, which is incorporated herein by reference.

CROSS REFERENCE TO RELATED APPLICATION

This application is related to the pending U.S. patent application Ser. No. 09/440,323 filed on Nov. 15, 1999, now U.S. Pat. No. 6,532,565 B1.

BACKGROUND

The present invention relates in general to a magnetoresistive solid-state storage device employing error correction coding (ECC), and in particular relates to a method for error correction decoding of ECC encoded data stored in the device.

A typical solid-state storage device comprises one or more arrays of storage cells for storing data. Existing semiconductor technologies provide volatile solid-state storage devices suitable for relatively short term storage of data, such as dynamic random access memory (DRAM), or devices for relatively longer term storage of data such as static random access memory (SRAM) or non-volatile flash and EEPROM devices. However, many other technologies are known or are being developed.

Recently, a magnetoresistive storage device has been developed as a new type of non-volatile solid-state storage device (see, for example, EP-A-0918334 Hewlett-Packard). The magnetoresistive solid-state storage device is also known as a magnetic random access memory (MRAM) device. MRAM devices have relatively low power consumption and relatively fast access times, particularly for data write operations, which renders MRAM devices ideally suitable for both short term and long term storage applications.

A problem arises in that MRAM devices are subject to physical failure, which can result in an unacceptable loss of stored data. In particular, currently available manufacturing techniques for MRAM devices are subject to limitations and as a result manufacturing yields of acceptable MRAM devices are relatively low. Although better manufacturing techniques are being developed, these tend to increase manufacturing complexity and cost. Hence, it is desired to apply lower cost manufacturing techniques whilst increasing device yield. Further, it is desired to increase cell density formed on a substrate such as silicon, but as the density increases manufacturing tolerances become increasingly difficult to control leading to higher failure rates and lower device yields. Since the MRAM devices are at a relatively early stage in development, it is desired to allow large scale manufacturing of commercially acceptable devices, whilst tolerating the limitations of current manufacturing techniques.

SUMMARY

An aim of the present invention is to provide a method for error correction decoding of ECC encoded data stored in an MRAM device, wherein effectiveness of an ECC scheme is maximized, and/or where overhead associated with error correction coding can be reduced. A preferred aim is to provide such a method whereby a relatively large number of physical failures can be tolerated.

According to a first aspect of the present invention there is provided a method for error correction decoding of ECC encoded data stored in a magnetoresistive solid-state storage device having a plurality of magnetoresistive storage cells, comprising the steps of reading a set of the storage cells of interest, relating to at least one block of ECC encoded data; examining a set of test cells corresponding to the cells of interest, to generate erasure information for the at least one block of ECC encoded data; and error correction decoding the at least one block of ECC encoded data with reference to the erasure information.

The method preferably comprises providing the plurality of storage cells in at least one array having rows and columns. Preferably, the test cells are provided in a test row, wherein the test cells in the test row share columns with the set of cells of interest in the read operation of the block of ECC encoded data. Preferably, a row of "good" storage cells are selected to be the test row of test cells. Here, the test cells are susceptible to being affected by failures in other rows, but there are no cells in the test row which themselves cause a grouped-type failure affecting the test row.

The step of examining the test cells preferably comprises reading the test cells and comparing the read values against expected values. The expected values are suitably written to the test cells in advance of examining the test cells. Preferably, the test cells corresponding to the cells of interest are selected and examined, in co-operation with reading of the storage cells of interest. In one embodiment, the examining step is performed contemporaneously with the reading step. In another embodiment, the reading step is performed one or more times relating to more than one block of ECC encoded data, and examining step is performed once to generate erasure information for the more than one block of ECC encoded data.

The step of error correction decoding the block of stored ECC encoded data with reference to the erasure information allows correct values for the ECC encoded data to be calculated, and allows original information to be recovered correctly from the stored ECC encoded data. Suitably, the ECC encoded data comprises symbols, and the erasure information identifies the location of zero or more symbol errors in the block of ECC encoded data, which improves ease of calculation of corrected symbol values.

Optionally, the method includes the step of writing back corrected encoded data to the storage device, suitably using the same set of storage cells. Preferably, this write-back operation is performed selectively, such that corrected encoded data is written back to the storage cells with reference to the erasure information. Preferably, the write-back step comprises selectively not writing back corrected data to storage cells which are determined as affected by physical failures.

The method preferably includes the initial steps of receiving a logical unit of original information which it is desired to store in the device, encoding the original information to form a block of ECC encoded data, and storing the block of ECC encoded data in the array of storage cells. Each logical unit of original information preferably corresponds to a sector such as 512 bytes. Encoding the original information sector forms an encoded sector, which preferably comprises four codewords. Here, each codeword is preferably treated as a separate block of ECC encoded data.

According to a second aspect of the present invention there is provided a method for error correction decoding of ECC encoded data stored in a magnetoresistive solid-state storage device having a plurality of magnetoresistive storage cells arranged in at least one array, the method comprising the steps of: selecting a row from an array of the at least one array to provide a test row of test cells; selecting a set of storage cells arranged to store at least one block of ECC encoded data; reading the at least one block of ECC encoded data from the selected set of storage cells; performing a write-read-compare operation on a selected set of the test cells to predict columns in the array that are affected by a physical failure; forming erasure information for the at least one block of ECC encoded data, the erasure information identifying symbols within the block of ECC encoded data predicted to be affected by physical failures as determined by the test cells; and decoding the at least one block of ECC encoded data with reference to the erasure information.

According to a third aspect of the present invention there is provided a magnetoresistive solid state storage device, comprising: at least one array of magnetoresistive storage cells; a controller arranged to examine a set of test cells to form erasure information for at least one block of ECC encoded data stored in a set of the storage cells; and an ECC decoding unit arranged to decode the at least one block of stored ECC encoded data with reference to the erasure information.

According to a fourth aspect of the present invention there is provided a magnetoresistive solid-state storage device, comprising: at least one array of magnetoresistive storage cells; an ECC coding unit arranged to receive original information and to form at least one block of ECC encoded data; a controller arranged to store the at least one block of ECC encoded data in a set of storage cells, and to read the stored at least one block of ECC encoded data from the set of storage cells, the controller arranged to examine a set of test cells corresponding to the set of storage cells to form erasure information for the at least one block of ECC encoded data; and an ECC decoding unit for decoding the at least one block of stored ECC encoded data with reference to the erasure information.

The invention also extends to apparatus incorporating a magnetoresistive storage device as defined herein.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DECRIPTION

To assist a complete understanding of the present invention, an example MRAM device will first be described with reference to FIGS. 1 and 2, including a description of the failure mechanisms found in MRAM devices. The error correction decoding arrangements adopted in the preferred embodiments of the present invention aim to minimize the aderse effects of such physical failures and are described with reference to FIGS. 3 to 5.

Figure 1:
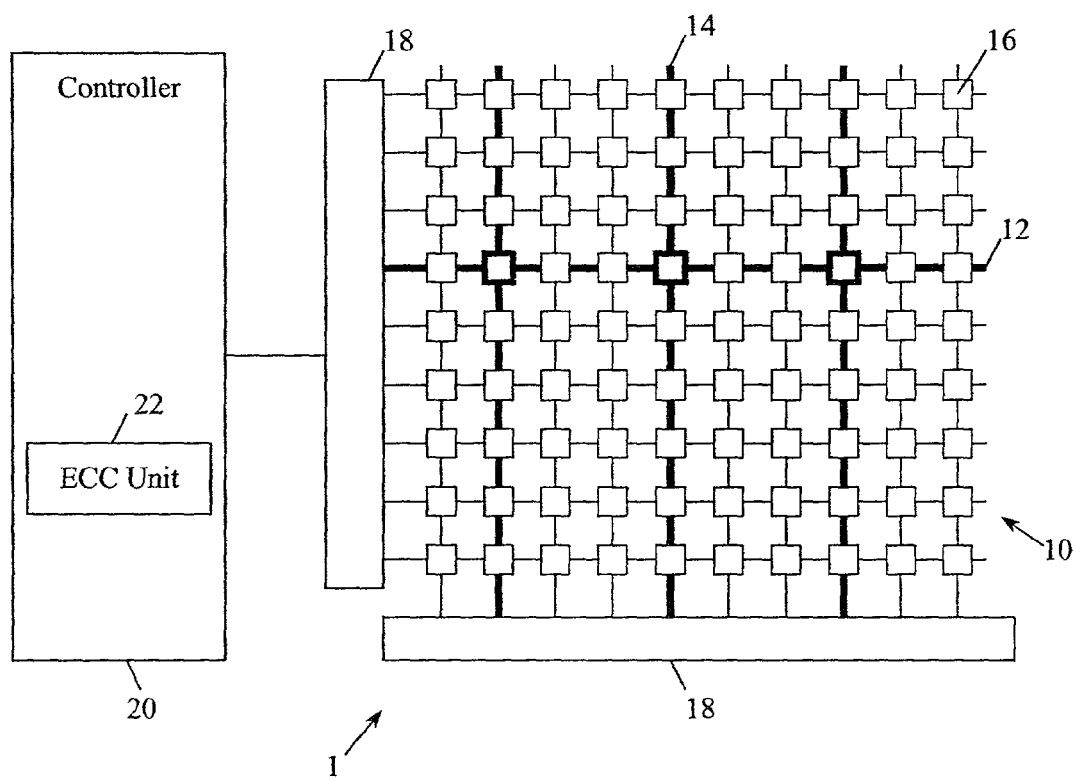
FIG. 1 is a schematic diagram showing a preferred MRAM device including an array of storage cells.

FIG. 1 shows a simplified magnetoresistive solid-state storage device 1 comprising an array 10 of storage cells 16. The array 10 is coupled to a controller 20 which, amongst other control elements, includes an ECC coding and decoding unit 22. The controller 20 and the array 10 can be formed on a single substrate, or can be arranged separately. EP-A-0 918 334 (Hewlett-Packard) discloses one example of a magnetoresistive solid-state storage device which is suitable for use in preferred embodiments of the present invention.

In the preferred embodiment, the array 10 comprises of the order of 1024 by 1024 storage cells, just a few of which are illustrated. The storage cells 16 are each formed at an intersection between control lines 12 and 14. In this example control lines 12 are arranged in rows, and control lines 14 are arranged in columns. The control lines 12 and 14 are generally orthogonal, but other more complicated lattice structures are also possible. Suitably, the row and column lines 12,14 are coupled to control circuits 18, which include a plurality of read/write control circuits. Depending upon the implementation, one read/write control circuit is provided per column, or read/write control circuits are multiplexed or shared between columns.

In a device access such as a write operation or a read operation, one row 12 and one or more columns 14 are selected by the control circuits 18 to access the required storage cell or cells 16 (or conversely one column and several rows, depending upon the orientation of the array) The selected cells 16, the selected row line 12, and the selected column lines 14, are each represented by bold lines in FIG. 1. The preferred MRAM device requires a minimum distance m, such as sixty-four cells, between the selected column lines 14 to minimise cross-cell interference. Given that each array 10 has rows of length l, such as 1024 storage cells, it is possible to access substantially simultaneously up to l/m=1024/64=16 cells from the array 10.

Each storage cell 16 stores one bit of data suitably representing a numerical value and preferably a binary value, i.e. one or zero. Suitably, each storage cell includes two films which assume one of two stable magnetisation orientations, known as parallel and anti-parallel. The magnetisation orientation affects the resistance of the storage cell. When the storage cell 16 is in the anti-parallel state, the resistance is at its highest, and when the magnetic storage cell is in the parallel state, the resistance is at its lowest. Suitably, the high resistance anti-parallel state defines a "0" logic state, and the low resistance parallel state defines a "1" logic state, or vice versa. In the preferred device, the resistance of each storage cell 16 is determined according to a phenomenon known as spin tunnelling and the cells are referred to as magnetic tunnel junction storage cells. The condition of the storage cell is determined by measuring the sense current (proportional to resistance) or a related parameter such as response time to discharge a known capacitance, which gives one or more parametric values for each storage cell. A logical value can then be derived from the obtained parametric value or values. Depending upon the nature and construction of the MRAM device, the read operation may comprise multiple steps or require combined read and rewrite actions.

Figure 2:
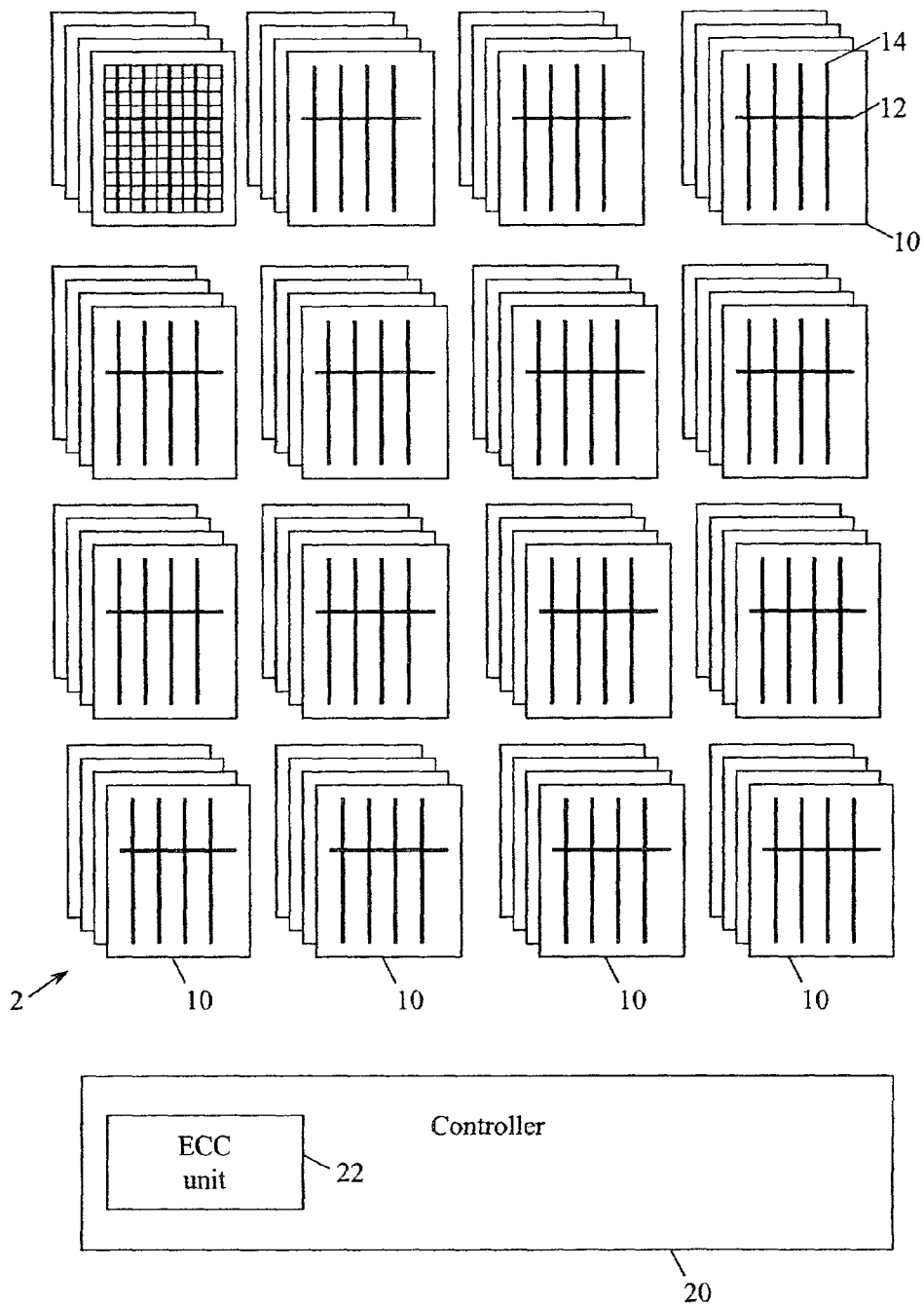
FIG. 2 shows a preferred MRAM device in more detail.

FIG. 2 shows the preferred MRAM device in more detail. A macro-array 2 is formed comprising a large plurality of individual arrays 10, each of which is formed as discussed above for FIG. 1. The use of plural arrays advantageously allows an MRAM device to be obtained of a desired overall data storage capacity, without the individual arrays 10 in themselves becoming so large that they are difficult to manufacture or control. For simplicity, FIG. 2 shows only a portion of the macro-array.

Many design choices are available to the skilled person when laying out the arrays 10 on a suitable substrate during manufacture of the device, but, amongst other concerns, it is commonly desired to reduce substrate area for each device. Conveniently, it has been found that the arrays 10 can be manufactured in layers. In the example of FIG. 2, four arrays 10 are layered to form a stack. In an example practical device having a storage capacity of the order of 128 Mbytes, 1024 arrays are arranged in a macro-array of 16 arrays wide, by 16 arrays high, with four stack layers. In other preferred devices, ECC encoded data is stored in 1152 arrays arranged 16 wide by 18 high with 4 stack layers, giving a total capacity of 144 Mbytes, or 1280 arrays arranged 16 wide by 20 high by 4 stack layers giving 160 Mbytes. Optionally, the MRAM device comprises more than one such macro-array.

As illustrated in FIG. 2, the preferred method for accessing the MRAM device 1 comprises selecting one row 12 in each of a plurality of arrays 10, and selecting plural columns 14 from each of the plurality of arrays to thereby select a plurality of storage cells 16. The accessed cells within each of the plurality of arrays correspond to a small portion of a unit of data. Together, the accessed cells provide a whole unit of data, such as a whole sector unit, or at least a substantial portion of the unit. Advantageously, each of the plurality of arrays are accessible substantially simultaneously. Therefore, device access speed for a read operation or a write operation is increased. This device access is conveniently termed a slice through the macro-array.

As shown in FIG. 2, it is convenient for the same row address and the same column addresses to be selected in each of the plurality of arrays. That is, a unit of data is stored across a plurality of arrays, using the same row and column addresses within each of the plurality of arrays.

As also shown in FIG. 2, in the preferred construction the arrays 10 are layered to form stacks. Only one array within each stack can be accessed at any one time. Therefore, it is convenient that the plurality of arrays used to store a sector unit of data are each in different stacks (i.e. none of the selected plurality of arrays are in the same stack). Also, it is convenient to select arrays which are all in the same layer. Ideally, one array is selected from each stack, the arrays each being in the same layer within each stack. In the example of FIG. 2, the topmost array within each stack has been selected.

Most conveniently, the number of arrays available in the macro-array 2 is matched to the size of a sector unit of data to be stored in the device. Here, it is convenient to provide the total number of arrays such that, given the number of cells which can be substantially simultaneously accessed in an array, a sector unit is stored using cells within all of the arrays of a single layer of the device, to store a whole sector unit of data. In other preferred embodiments, it is convenient for a reciprocal integer fraction of a sector unit of data (e.g. one half or one third or one quarter of a sector unit) to be accessible substantially simultaneously.

Although generally reliable, it has been found that failures can occur which affect the ability of the device to store data reliably in the storage cells 16. Physical failures within a MRAM device can result from many causes including manufacturing imperfections, internal effects such as noise in a read process, environmental effects such as temperature and surrounding electro-magnetic noise, or ageing of the device in use. In general, failures can be classified as either systematic failures or random failures. Systematic failures consistently affect a particular storage cell or a particular group of storage cells. Random failures occur transiently and are not consistently repeatable. Typically, systematic failures arise as a result of manufacturing imperfections and ageing, whilst random failures occur in response to internal effects and to external environmental effects.

Failures are highly undesirable and mean that at least some storage cells in the device cannot be written to or read from reliably. A cell affected by a failure can become unreadable, in which case no logical value can be read from the cell, or can become unreliable, in which case the logical value read from the cell is not necessarily the same as the value written to the cell (e.g. a "1" is written but a "0" is read). The storage capacity and reliability of the device can be severely affected and in the worst case the entire device becomes unusable.

Failure mechanisms take many forms, and the following examples are amongst those identified:

1. Shorted bits—where the resistance of the storage cell is much lower than expected. Shorted bits tend to affect all storage cells lying in the same row and the same column.
2. Open bits—where the resistance of the storage cell is much higher than expected. Open bit failures can, but do not always, affect all storage cells lying in the same row or column, or both.
3. Half-select bits—where writing to a storage cell in a particular row or column causes another storage cell in the same row or column to change state. A cell which is vulnerable to half select will therefore possibly change state in response to a write access to any storage cell in the same row or column, resulting in unreliable stored data.
4. Single failed bits—where a particular storage cell fails (e.g. is stuck always as a "0"), but does not affect other storage cells and is not affected by activity in other storage cells.

These four example failure mechanisms are each systematic, in that the same storage cell or cells are consistently affected. Where the failure mechanism affects only one cell, this can be termed an isolated failure. Where the failure mechanism affects a group of cells, this can be termed a grouped failure.

Whilst the storage cells of the MRAM device can be used to store data according to any suitable logical layout, data is preferably organised into basic sub-units (e.g. bytes) which in turn are grouped into larger logical data units (e.g. sectors). A physical failure, and in particular a grouped failure affecting many cells, can affect many bytes and possibly many sectors. It has been found that keeping information about each small logical sub-unit (e.g. bytes) affected by physical failures is not efficient, due to the quantity of data involved. That is, attempts to produce a list of all such logical units rendered unusable due to at least one physical failure, tend to generate a quantity of management data which is too large to handle efficiently. Further, depending on how the data is organised on the device, a single physical failure can potentially affect a large number of logical data units, such that avoiding use of all bytes, sectors or other units affected by a failure substantially reduces the storage capacity of the device. For example, a grouped failure such as a shorted bit failure in just one storage cell affects many other storage cells, which lie in the same row or the same column. Thus, a single shorted bit failure can affect 1023 other cells lying in the same row, and 1023 cells lying in the same column—a total of 2027 affected cells. These 2027 affected cells may form part of many bytes, and many sectors, each of which would be rendered unusable by the single grouped failure.

Some improvements have been made in manufacturing processes and device construction to reduce the number of manufacturing failures and improve device longevity, but this usually involves increased manufacturing costs and complexity, and reduced device yields.

The preferred embodiments of the present invention employ error correction coding to provide a magnetoresistive solid-state storage device which is error tolerant, preferably to tolerate and recover from both random failures and systematic failures. Typically, error correction coding involves receiving original information which it is desired to store and forming encoded data which allows errors to be identified and ideally corrected. The encoded data is stored in the solid-state storage device. At read time, the original information is recovered by error correction decoding the encoded stored data. A wide range of error correction coding (ECC) schemes are available and can be employed alone or in combination. Suitable ECC schemes include both schemes with single-bit symbols (e.g. BCH) and schemes with multiple-bit symbols (e.g. Reed-Solomon).

As general background information concerning error correction coding, reference is made to the following publication: W. W. Peterson and E. J. Weldon, Jr., "Error-Correcting Codes", 2$^{nd}$ edition, 12$^{th}$ printing, 1994, MIT Press, Cambridge Mass.

A more specific reference concerning Reed-Solomon codes used in the preferred embodiments of the present invention is: "Reed-Solomon Codes and their Applications", ED. S. B. Wicker and V. K. Bhargava, IEEE Press, New York, 1994.

Figure 3:
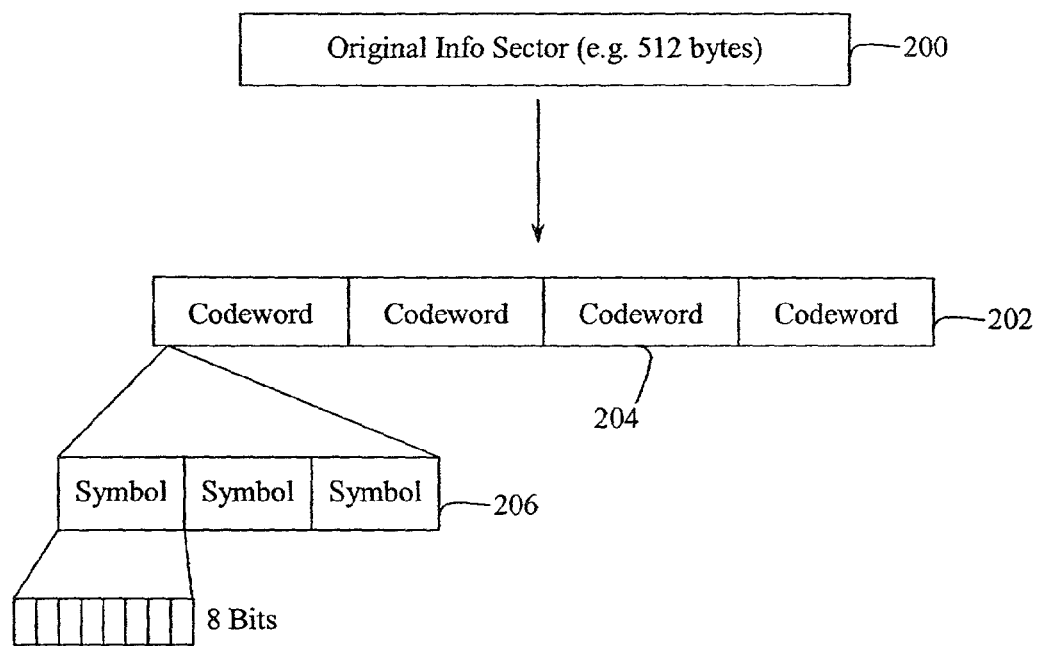
FIG. 3 shows a preferred logical data structure.

FIG. 3 shows an example logical data structure used when storing data in the MRAM device 10. Original information 200 is received in predetermined units such as a sector comprising 512 bytes. Error correction coding is performed to produce ECC encoded data, in this case an encoded sector 202. The encoded sector 202 comprises a plurality of symbols 206 which can be a single bit (e.g. a BCH code with single-bit symbols) or can comprise multiple bits (e.g. a Reed-Solomon code using multi-bit symbols). In the preferred Reed-Solomon encoding scheme, each symbol 206 conveniently comprises eight bits and, as shown in FIG. 3, each encoded sector 202 comprises four codewords 204, each comprising of the order of 144 to 160 symbols. The eight bits corresponding to each symbol are conveniently stored in eight storage cells 16, which can be termed a symbol group. A physical failure which directly or indirectly affects any of these eight storage cells in a symbol group can result in one or more of the bits being unreliable (i.e. the wrong value is read) or unreadable (i.e. no value can be obtained), giving a failed symbol.

In the current MRAM devices, grouped failures tend to affect a large group of storage cells, sharing the same row or column. This provides an environment which is unlike prior storage devices. The preferred embodiments of the present invention employ an ECC scheme with multi-bit symbols. Where manufacturing processes and device design change over time, it may become more appropriate to organise storage locations expecting bit-based errors and then apply an ECC scheme using single-bit symbols, and at least some of the following embodiments can be applied to single-bit symbols.

Error correction decoding each block of stored ECC encoded data allows failed symbols 206 to be identified and corrected. Conveniently, decoding is performed independently for each block of ECC encoded data, such as an ECC encoded sector 202 or, in the preferred embodiment, for each codeword 204. Hence, the encoded sector 202, or preferably each ECC codeword 204, forms the unit of data to be stored in the device.

The preferred Reed-Solomon scheme is an example of a linear error correcting code, which mathematically identifies and corrects completely up to a predetermined maximum number of failed symbols 206 within each independently decodeable block of ECC encoded data, depending upon the power of the code. For example, a [160,128,33] Reed-Solomon code producing codewords having one hundred and sixty 8-bit symbols corresponding to one hundred and twenty-eight original information bytes and a minimum distance of thirty-three symbols can locate and correct up to sixteen symbol errors.

Suitably, the ECC scheme employed is selected with a power sufficient to recover original information 200 from the encoded data in substantially all cases. Pictorially, each perfect block of ECC encoded data represents a point in space, and a reliably correctable form of that block of ECC encoded data lies within a "ball" having a radius corresponding to the maximum power of the ECC encoding scheme. Very rarely, a block of encoded data is encountered which is affected by so many failures that the original information 200 is unrecoverable. Here, the ECC decoding unit 22 is presented with a block of ECC encoded data which is so severely affected by physical failures that it lies outside the ball of all reliably correctable blocks of ECC encoded data. Also, even more rarely, the failures result in a mis-correct, where information recovered from the encoded data 202 is not equivalent to the original information 200. Even though the recovered information does not correspond to the original information, a mis-correct is not readily determined. Pictorially, the ECC decoding unit 22 is presented with a block of ECC encoded data which is so severely affected by physical failures that it lies inside an incorrect ball, i.e. not the ball corresponding to the perfect form of that block of ECC encoded data. Ideally, the ECC scheme is selected such that the probability of encountering an unrecoverable or mis-corrected block of ECC encoded data is extremely small, suitably of the order of $10^{-15}$ to $10^{-20}$.

It is desired to minimise the probability that original information is unrecoverable from a block of stored encoded data or that a mis-correct occurs. Therefore, the preferred embodiments of the invention aim to improve effective use of an error correction coding scheme, as will be described below.

Figure 4:
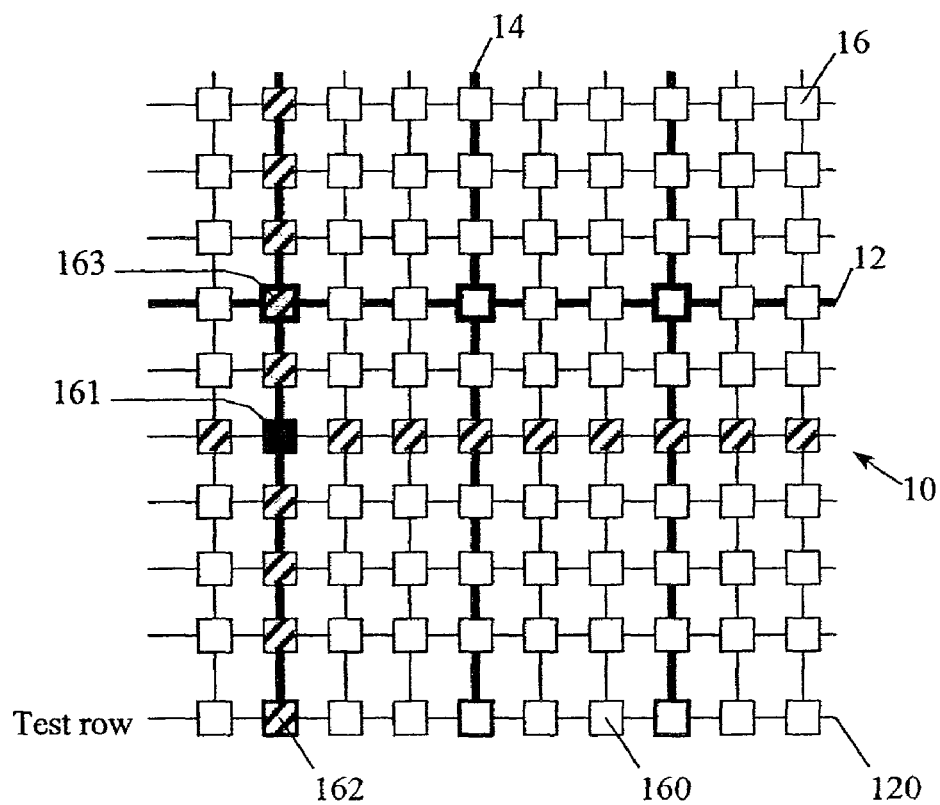
FIG. 4 shows a portion of an array including a test row.

FIG. 4 shows schematically a portion of an array 10, similar to the array described above with reference to FIG. 1. In FIG. 4, the array 10 includes a row 120 of test cells 160. Conveniently, the test cells 160 are configured substantially identically to the storage cells 16 of the remainder of the array. The test row 120 can be provided at any convenient location, such as at the top or at the bottom or within the array 10. Most conveniently, a row of storage cells 16 from the array 10 is selected to function as the test row 120. The test row is suitably selected to be a row which itself does not contain failed cells, but is positioned to be affected by failed cells in other rows. The test row is preferably determined at manufacture of the device. If desired, the test row 120 can be reselected or moved from time to time.

Conveniently, it has been found that examining the condition of the test cells 160 in the test row 120 allows accurate predictions to be made about the condition of storage cells 16 in other parts of the array. As an illustrative example, FIG. 4 shows a portion of the array 10 where a cell 161 suffers a shorted-bit failure. Due to the nature of this failure in the preferred MRAM devices, the shorted-bit cell 161 affects all of the cells lying in the same row and in the same column, including a test cell 162 amongst the test cells 160 in the test row 120. Therefore, the test cell 162 indicates that a shorted-bit failure has occurred affecting the column in which that test cell 162 lies.

During a read operation, a row line 12 and one or more column lines 14 are activated to select a set of storage cells 16 within the array 10, shown in bold lines in FIG. 4. A failed cell 163 which has been affected by the shorted-bit cell 161 is amongst these selected cells. By examining the condition of the test cell 162, it can be predicted that the selected cell 163 has been affected by a failure. This prediction then allows enhancements to be made in the subsequent stages of the read operation concerning the selected cells.

In one simple mode of operation, the test cells are examined once, in order to determine columns 14 within the array 10 which are affected by failures, particularly shorted-bit or open-bit failures. This information is then retained, and employed as each read access is made. However, a relatively large amount of information must be stored and retained. In another simple mode of operation, the test row 120 is examined for each read operation and the test information discarded at the completion of that read operation. Here, there is a balance between the overhead of retaining a large amount of test information, compared with an overhead of examining the test cells 160 in the test row 120. In a preferred embodiment, the test cells relating to a first read operation are examined and the test information then retained if a second or subsequent read operation relates to the examined test cells, i.e. the test information is retained and used again when a subsequent read operation will refer to the same test cells. The test information is discarded only when a subsequent read operation relates to a different set of test cells. Conveniently, a data storage layout is employed such that units of data (e.g. sectors) which are likely to be accessed successively in use are arranged to use storage cells relating to a consistent set of test cells, i.e. arranged to use sets of storage cells arranged in consecutive rows and a consistent set of columns. For example, data from a large source file is stored across several consecutive sectors arranged with shared columns and so these sectors will be read in a sequence to recover the stored source file.

Examination of the test cells 160 may take any suitable form. In the preferred embodiment, each test cell 160 is written with a known value, such as a logical "1". The test cells 160 are then examined by reading logical values. If any of the test cells show a logical value of "0" then it can be predicted that a failure, such as a shorted-bit failure, has occurred which affects the column 14 in which that test cell 160 lies. Similarly, writing a "0" to the test cells and reading a "1" would indicate an open-bit failure. Optionally, two test rows are provided, with the first arranged to indicate a shorted-bit failure, and the second arranged to indicate an open-bit failure. The test cells can be written once and read repeatedly, or can be rewritten after each read, as required to maintain integrity of the cells. The location and nature of the test cells 160 and the method for examination of the test cells 160 is readily adapted according to the specific nature of a particular MRAM device.

Advantageously, predicting failed cells 163 amongst a set of cells of interest in a read operation allows error correction decoding of ECC encoded data stored in the MRAM device to be significantly enhanced. The predicted failures allow erasure information to be formed for a block of ECC encoded data read from the MRAM device 1.

Figure 5:
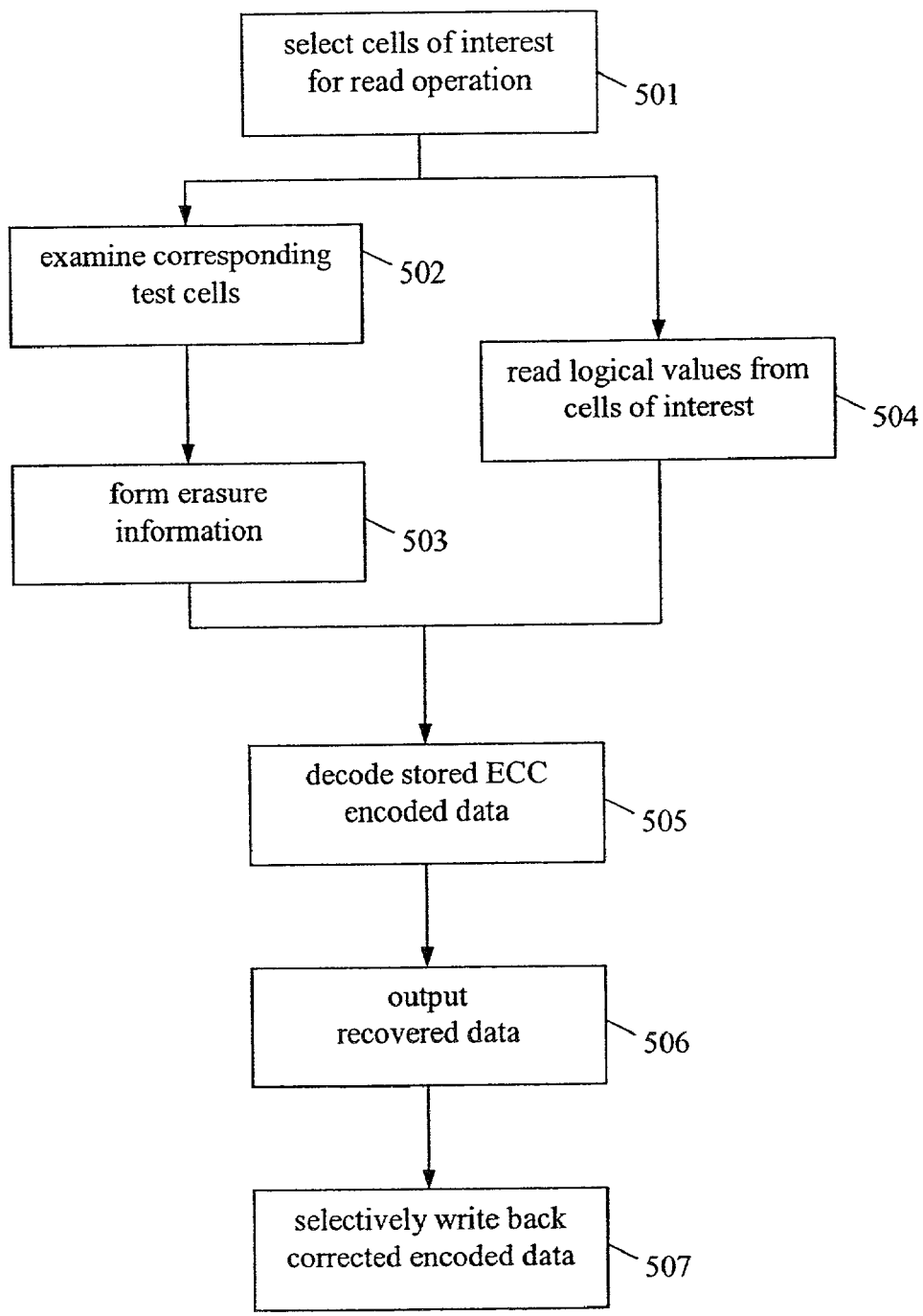
FIG. 5 shows a preferred method for decoding ECC encoded data stored in the device.

FIG. 5 shows a preferred method for decoding of ECC encoded data stored in a MRAM device. Preferably, the MRAM device 1 is configured as discussed above in FIGS. 1, 2 and 4, and the stored data is error correction encoded into a format as shown in FIG. 3.

Step 501 comprises selecting a set of storage cells 16 of interest in a read operation. Conveniently, the selected set of storage cells correspond to at least one block of ECC encoded data, such as a codeword 204 or a complete encoded sector 202.

Step 502 comprises examining a corresponding set of test cells 160 in a test row 120. The corresponding set of test cells lie in the same columns as the selected cells of interest.

Step 503 comprises forming erasure information by predicting failures amongst the cells of interest, from the examination of the set of test cells 160. The examination suitably comprises reading logical values from the test cells, and comparing the read values against expected values.

Step 504 comprises reading logical values from the set of storage cells 16 of interest in the read operation. The read process conveniently comprises obtaining parametric values relating to the selected set of storage cells 16, such as one or more parametric values obtained from a sense current and representing cell resistance or response time. In one embodiment, the sensed parametric values are compared against a simple threshold, and a logical value is derived such as a binary 1 or 0 depending on whether the sensed parametric values are above or below the threshold, respectively. Optionally, this read process is repeated, in the hope of avoiding a transient or random error. However, particularly with currently available MRAM devices, a small number of systematic failures are to be expected when accessing any significant number of storage cells, such as the set of storage cells corresponding to an ECC codeword 204 or an encoded sector 202.

The logical values and erasure information can be presented in any suitable form. In one example, the logical bit values are determined with hard decisions as to the value of each bit, or else the bit is determined as a failure and erasure information is generated accordingly. In a second example, soft decisions are made as to the relative certainty with which erasure information is generated. For example, the examined test cells are ranked in order of quality, and only the n most severely affected cells amongst the cells of interest lead to erasures. Ideally, the logical symbol values and the erasure information are arranged to form an input (or inputs) to the ECC decoder 22.

It is convenient to prepare the erasure information in parallel with generating the logical bit values. In the currently preferred embodiments, each storage cell 16 stores a single logical bit value representing a binary 1 or 0, and multiple bits are gathered together to form a symbol 206. Preferably, the erasure information is prepared on the basis that a symbol 206 is declared as an erasure where any one or more of the cells in a symbol group storing that symbol are predicted to be a failed storage cell 163.

Step 505 comprises error correction decoding the block of stored ECC encoded data, using the symbol logical values and taking account of the erasure information. In the preferred ECC coding scheme, each codeword 204 is decoded in isolation, and the results from ECC decoding plural codewords (in this case four codewords) provides ECC decoded data corresponding to the original information sector 200. As will be familiar to those skilled in the field of ECC, available error correction codes allow a predetermined number of full errors to be corrected (i.e. where the location of a symbol error is unknown and the symbol value is unknown), and twice that predetermined number of erasures (i.e. where the location of a symbol error is known and just the symbol value remains unknown) or a combination of the two. For example, the preferred [160,128,33] Reed-Solomon code is mathematically able to correct up to sixteen full errors or up to thirty-two erasures (or a combination, such as twenty erasures and six full errors). Advantageously, the error correction decoding is able to correct a greater number of errors using the generated erasure information, compared with a situation where this erasure information is not available.

Step 506 comprises providing an output from the decoding step 505 as recovered information. In the preferred embodiment, the power of the error correction coding scheme is chosen to balance an overhead of the ECC scheme against the probability of encountering failed symbols. In substantially all practical cases the number of failures is within the power of the decoder to correct, and the original information 200 is recovered and output at step 506. The loss of original information due to an unrecoverable or miscorrected block of stored encoded data is very rare.

The method optionally comprises the additional step 507 of writing back corrected data to the MRAM storage array. In order to avoid error propagation, corrected data obtained by performing ECC decoding is written back to the storage cells of interest in that read operation. However, this write-back operation incurs a delay and slows overall operation of the MRAM device. To reduce the overhead of this write-back operation, suitably the encoded data as input to the decoder is compared with an output of the decoder, and only any symbols which have been changed (i.e. corrected) by the decoder are written back to the array. Further, corrected data is only written back to good storage cells, and corrected data is not written back to failed storage cells. In the present example, some symbol groups of storage cells are predicted to be affected by a systematic failure, from the erasure information. Therefore, writing back corrected data to these storage cells is wasteful, because the next read operation using these storage cells will almost certainly encounter the same failure. Preferably, writing back corrected data is performed on the basis of the erasure information obtained in step 503. That is, any symbol group identified as an erasure in step 503 is not used in the write-back of corrected data.

The method discussed above is particularly useful in determining some forms of failures, such as grouped-type shorted-bit failures and open-bit failures in MRAM devices. By contrast, an isolated systematic failure such as a half-select bit is not so easily detectable using the test rows, but the effects of such a failure are easily discovered by performing error correction decoding. Therefore, combining the use of test cells with error correction coding provides a practical device which is able to take advantage of the considerable benefits offered by the new MRAM technology whilst minimising the limitations of current manufacturing techniques.

The MRAM device described herein is ideally suited for use in place of any prior solid-state storage device. In particular, the MRAM device is ideally suited both for use as a short-term storage device (e.g. cache memory) or a longer-term storage device (e.g. a solid-state hard disk). An MRAM device can be employed for both short term storage and longer term storage within a single apparatus, such as a computing platform.

A magnetoresistive solid-state storage device and a method for decoding data stored in such a device have been described. Advantageously, the storage device is able to tolerate a relatively large number of errors, including both systematic failures and transient failures, whilst successfully remaining in operation with no loss of original data, through the use of error correction coding. Simpler and lower cost manufacturing techniques are employed and/or device yield and device density are increased. Error correction coding and decoding allows blocks of data, e.g. sectors or codewords, to remain in use, where otherwise the whole block must be discarded if only one failure occurs. Advantageously, generating erasure information allows significantly improved error correction decoding. Error correction overhead in the stored encoded data can be reduced and/or more powerful error correction can be obtained for the same overhead.

The invention claimed is:

1. A method for error correction decoding of ECC encoded data stored in a magnetoresistive solid-state storage device having a plurality of magnetoresistive storage cells, comprising:
   reading a set of the storage cells of interest, relating to at least one block of ECC encoded data;
   examining a set of test cells corresponding to the cells of interest, to generate erasure information for the at least one block of ECC encoded data identifying symbols within the block predicted to be affected by physical failures as determined by examining the test cells; and
   error correction decoding the at least one block of ECC encoded data with reference to the erasure information.

2. The method of claim 1, comprising providing the plurality of storage cells in an array of rows and columns, wherein the test cells are provided in a test row and the test cells share columns with the cells of interest.

3. The method of claim 2, comprising selecting a row of storage cells from the array to form the test row of test cells.

4. The method of claim 3, wherein the test cells in the test row are affectable by failures in other rows, but are not affected by failures within the test row.

5. The method of claim 1, wherein the examining step comprises reading the test cells and comparing the read values against expected values.

6. The method of claim 5, comprising writing the expected values to the test cells.

7. The method of claim 1, wherein the examining step is performed contemporaneously with the reading step.

8. The method of claim 1, wherein the reading step is performed one or more times relating to more than one block of ECC encoded data, and examining step is performed once to generate erasure information for the more than one block of ECC encoded data.

9. The method of claim 1, wherein the reading step comprises generating logical values for a plurality of symbols of the at least one block of ECC encoded data, and the examining step comprises identifying zero or more of the symbols as an erasure.

10. The method of claim 1, wherein the erasure information identifies one or more symbols in the at least one block of encoded data where a logical value is predicted to be unreliable.

11. The method of claim 1, wherein the decoding step comprises identifying the location of zero or more errors in the at least one block of ECC encoded data, with reference to the erasure information, and replacing each identified error with a calculated correct value.

12. The method of claim 1, comprising the step of selectively writing back corrected encoded data to the storage cells, with reference to the erasure information.

13. The method of claim 1, further comprising:
encoding a logical unit of original information to form at least one block of ECC encoded data; and
storing the block or blocks of ECC encoded data in the array of storage cells;
wherein the decoding step attempts to recover the logical unit of original information from the stored block or blocks of ECC encoded data.

14. A method for error correction decoding of ECC encoded data stored in a magnetoresistive solid-state storage device having a plurality of magnetoresistive storage cells arranged in at least one array, the method comprising:
selecting a row from an array of the at least one array to provide a test row of test cells;
selecting a set of storage cells arranged to store at least one block of ECC encoded data;
reading the at least one block of ECC encoded data from the selected set of storage cells;
performing a write-read-compare operation on a selected set of the test cells to predict columns in the array that are affected by a physical failure;
forming erasure information for the at least one block of ECC encoded data, the erasure information identifying symbols within the block of ECC encoded data predicted to be affected by physical failures as determined by the test cells; and
decoding the at least one block of ECC encoded data with reference to the erasure information.

15. A magnetoresistive solid state storage device, comprising:
at least one array of magnetoresistive storage cells;
a controller arranged to examine a set of test cells to form erasure information for at least one block of ECC encoded data stored in a set of the storage cells identifying symbols within the block predicted to be affected by physical failures as determined by examining the test cells; and
an ECC decoding unit arranged to decode the at least one block of stored ECC encoded data with reference to the erasure information.

16. An apparatus incorporating a magnetoresistive storage device according to claim 15.

17. A magnetoresistive solid-state storage device, comprising:
at least one array of magnetoresistive storage cells;
an ECC coding unit arranged to receive original information and to form at least one block of ECC encoded data;
a controller arranged to store the at least one block of ECC encoded data in a set of storage cells, and to read the stored at least one block of ECC encoded data from the set of storage cells, the controller arranged to examine a set of test cells corresponding to the set of storage cells to form erasure information for the at least one block of ECC encoded data identifying symbols within the block predicted to be affected by physical failures as determined by examining the test cells; and
an ECC decoding unit for decoding the at least one block of stored ECC encoded data with reference to the erasure information.

18. An apparatus incorporating a magnetoresistive storage device according to claim 17.

* * * * *